United States Patent
Omi et al.

(10) Patent No.: US 7,690,662 B2
(45) Date of Patent: Apr. 6, 2010

(54) STRUT-TYPE SUSPENSION DEVICE

(75) Inventors: Toshio Omi, Sakura (JP); Yukihiro Sugimoto, Ichikawa (JP)

(73) Assignee: Mitsubishi Steel Mfg. Co., Ltd., Tokyo (JP)

( * ) Notice: Subject to any disclaimer, the term of this patent is extended or adjusted under 35 U.S.C. 154(b) by 0 days.

(21) Appl. No.: 10/463,905

(22) Filed: Jun. 18, 2003

(65) Prior Publication Data
US 2004/0256830 A1 Dec. 23, 2004

(51) Int. Cl.
*B60G 15/00* (2006.01)

(52) U.S. Cl. ..................... 280/124.145; 280/124.147; 280/124.155

(58) Field of Classification Search .......... 280/124.145, 280/124.146, 124.147, 124.151, 124.154, 280/124.155
See application file for complete search history.

(56) References Cited

U.S. PATENT DOCUMENTS

| | | | | |
|---|---|---|---|---|
| 4,105,222 | A | * | 8/1978 | Buchwald ............ 280/124.104 |
| 4,274,655 | A | * | 6/1981 | Lederman ............ 280/124.155 |
| RE31,184 | E | | 3/1983 | Lederman |
| 4,756,517 | A | * | 7/1988 | Kakimoto ................. 267/220 |
| 5,074,579 | A | | 12/1991 | Evangelisti |
| 5,454,585 | A | * | 10/1995 | Dronen et al. ........ 280/124.145 |
| 5,467,971 | A | * | 11/1995 | Hurtubise et al. ........... 267/220 |
| 5,678,808 | A | * | 10/1997 | Claude et al. ............. 267/64.15 |
| 6,199,882 | B1 | * | 3/2001 | Imaizumi et al. ...... 280/124.146 |
| 6,367,830 | B1 | * | 4/2002 | Annequin et al. ...... 280/93.512 |
| 6,923,461 | B2 | * | 8/2005 | Momose et al. ....... 280/124.155 |

FOREIGN PATENT DOCUMENTS

| | | |
|---|---|---|
| JP | 61-93305 | 6/1986 |
| JP | 61-200017 | 9/1986 |
| JP | 04-224410 | 8/1992 |
| JP | 9-300932 | 11/1997 |
| WO | WO 02/40299 A1 | 5/2002 |

\* cited by examiner

*Primary Examiner*—Toan C To
(74) *Attorney, Agent, or Firm*—Flynn, Thiel, Boutell & Tanis, P.C.

(57) ABSTRACT

A strut type suspension device which contains a strut (7) whose upper end is supported on an insulator (3) mounted on a vehicle body (1), an upper seat (5) arranged on the lower face of the vehicle body with a bearing (4) interposed therebetween, a lower seat (8) fixed to said strut, and a compression coil spring (6) arranged around the strut between the upper seat and the lower seat, and which supports the vehicle body by means of the strut and is capable of turning about a kingpin axis, wherein the bearing is arranged in an inclined fashion such that the kingpin axis and the bearing central axis roughly coincide, so that no rotational moment is generated about the kingpin axis. Due to the above arrangement of the strut-type suspension device, the strain energy of the spring is unchanged irrespective of the rotation angle about the kingpin axis, even if the amount of the eccentricity varies, and thereby straight traveling stability is improved.

4 Claims, 7 Drawing Sheets

STRUT-TYPE SUSPENSION DEVICE

BACKGROUND OF THE INVENTION

1. Field of the Invention

The present invention relates to a strut-type suspension device for an automobile and in particular relates to a construction thereof for improving straight traveling stability during driving in a straight path.

2. Description of the Related Art

As shown in FIG. 4, in a conventional strut-type suspension device, an insulator 3 holding an elastic rubber element 2 in its interior is provided in a vehicle body 1. The upper end of a strut 7 is held in the elastic rubber element 2 within this insulator 3 and an upper seat 5 is arranged below the insulator 3, with a bearing 4 interposed therebetween. A lower seat 8 is fixed to the strut 7 and a compression coil spring 6 is held between this upper seat 5 and the lower seat 8. In this case, the central axis of the bearing coincides with the axis of the strut. 9 is the axis of a kingpin.

Japanese Utility Model Publication No. S61-93305A discloses improvements in a strut-type suspension device arranged such that torsion of the spring generated when the spring is displaced is released, by mounting a self-aligning bearing on an upper seat or a lower seat.

Also, in Laid-open Japanese Patent Publication No. 9-300932A, a rotational moment is generated in opposite directions in the right side suspension means and the left side suspension means. One of the beneficial effects of this is that the lowering of straight traveling stability is avoided.

FIG. 5 is a diagram of the operation of a conventional strut-type suspension device. In this case, the bearing is arranged so as to intersect the strut axis (the double-dotted chain line) at right angles. The upper seat 5 rotates about the strut axis 12 (=bearing axis 13) and the lower seat 8 rotates about the kingpin axis 9 (single-dotted chain line). Since the upper seat 5 and the lower seat 8 have respectively different axes of rotation, in general, a moment is generated about the kingpin, impairing the straight traveling stability.

FIG. 6 shows an imaginary plane at the upper seat of FIG. 5. The origin of the X and Y co-ordinates is centered on the strut axis 12, the forward direction of the vehicle body being X and the width direction of the vehicle body being Y. The point where the line of action of the load 14 intersects the upper seat or lower seat is called a point of action of the load 15. The relationship between the rotation angle θ about the kingpin axis and the strain energy stored in the spring when the kingpin axis is shifted in the X direction will now be examined wherein the point of action of the load is fixed. Throughout the specification, the rotation angle about the kingpin axis means the angle by which the upper or lower sheet rotates about the kingpin axis, unless otherwise specified.

FIG. 7 shows the relationship between the rotation angle θ and the strain energy in the prior art device when the bearing axis and the strut axis coincide. Taking the amount of eccentricity of the point of action of the load from the Y-axis as a parameter, it can be seen from the Figure that the strain energy of the spring varies with the rotation angle θ. Rotation of both the upper and lower seats therefore takes place in the direction such as to reduce the strain energy. For example if the amount of eccentricity is −10.3 mm, rotation takes place with a rotation angle θ in the negative direction and if the amount of eccentricity is 18 mm, rotation takes place with a rotation angle θ in the positive direction. This appears as a rotation moment about the kingpin.

It can also be seen from FIG. 7 that the direction of the rotation moment generated changes depending on whether the amount of eccentricity in the X direction is positive or negative. Consequently, if the amount of eccentricity is zero, even if rotation takes place, the strain energy is constant and a rotation moment is not generated.

SUMMARY OF THE INVENTION

An object of the present invention is to provide a strut-type suspension device wherein the strain energy of the spring is unchanged irrespective of the rotation angle θ about the kingpin axis, even if the amount of the above-mentioned eccentricity varies.

According to the present invention there is provided a strut type suspension device which comprises a strut whose upper end is supported by an insulator mounted on a vehicle body, an upper seat arranged below the vehicle body with a support member and a bearing interposed therebetween, a lower seat fixed to said strut, and a compression coil spring arranged coiled around the strut between the upper seat and the lower seat and which supports the vehicle body by means of the strut and is capable of turning about a kingpin axis, wherein the bearing is arranged in inclined fashion such that the kingpin axis and the bearing central axis roughly coincide, so that no rotational moment is generated about the kingpin axis.

DESCRIPTION OF THE PREFERRED EMBODIMENTS

Figure 1:
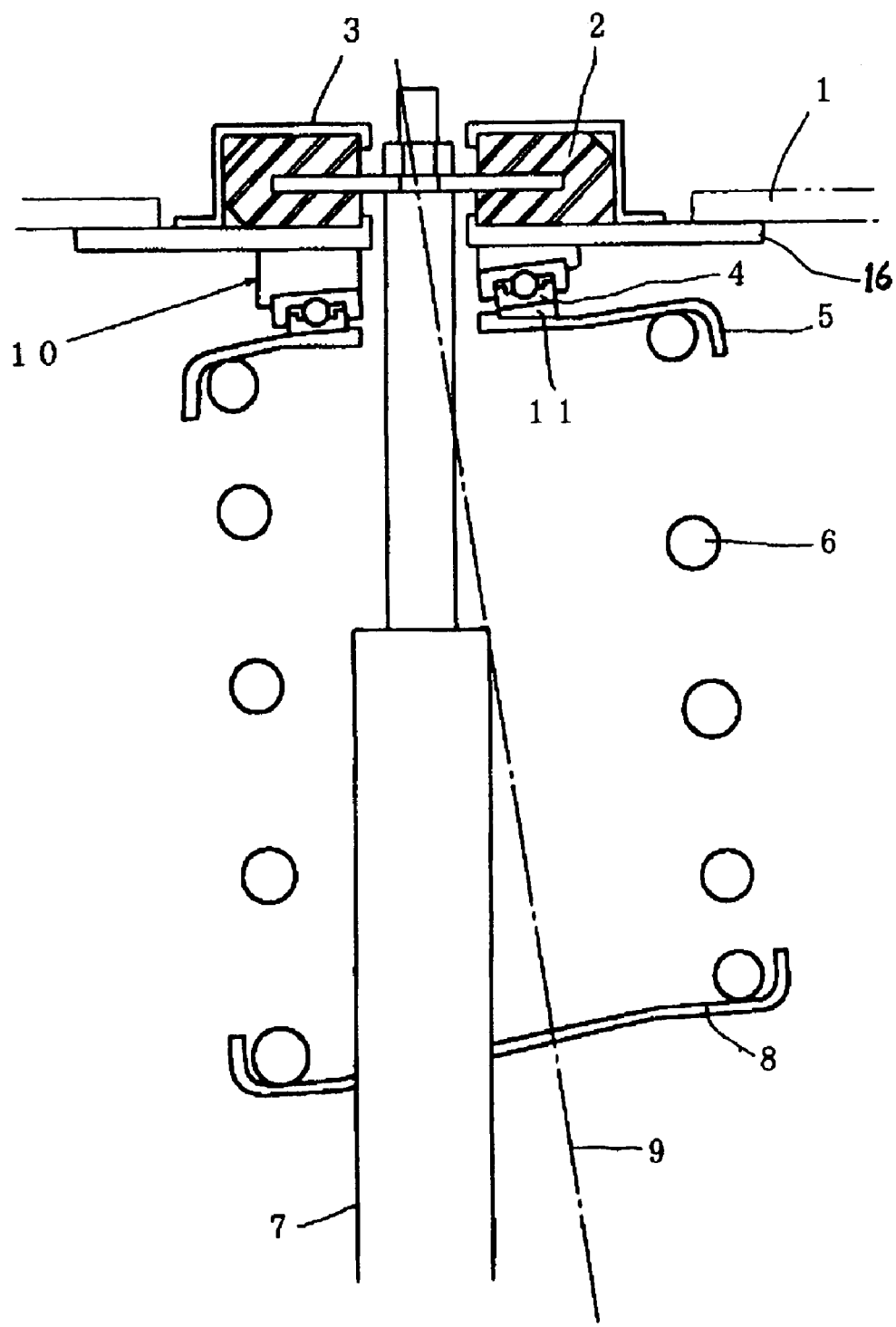
FIG. 1 is a constructional diagram of an embodiment of the present invention.

An embodiment of the present invention is described with reference to FIG. 1. Parts that are referred to by the same names as in the case of FIG. 4 are shown with the same reference symbols.

Figure 4:
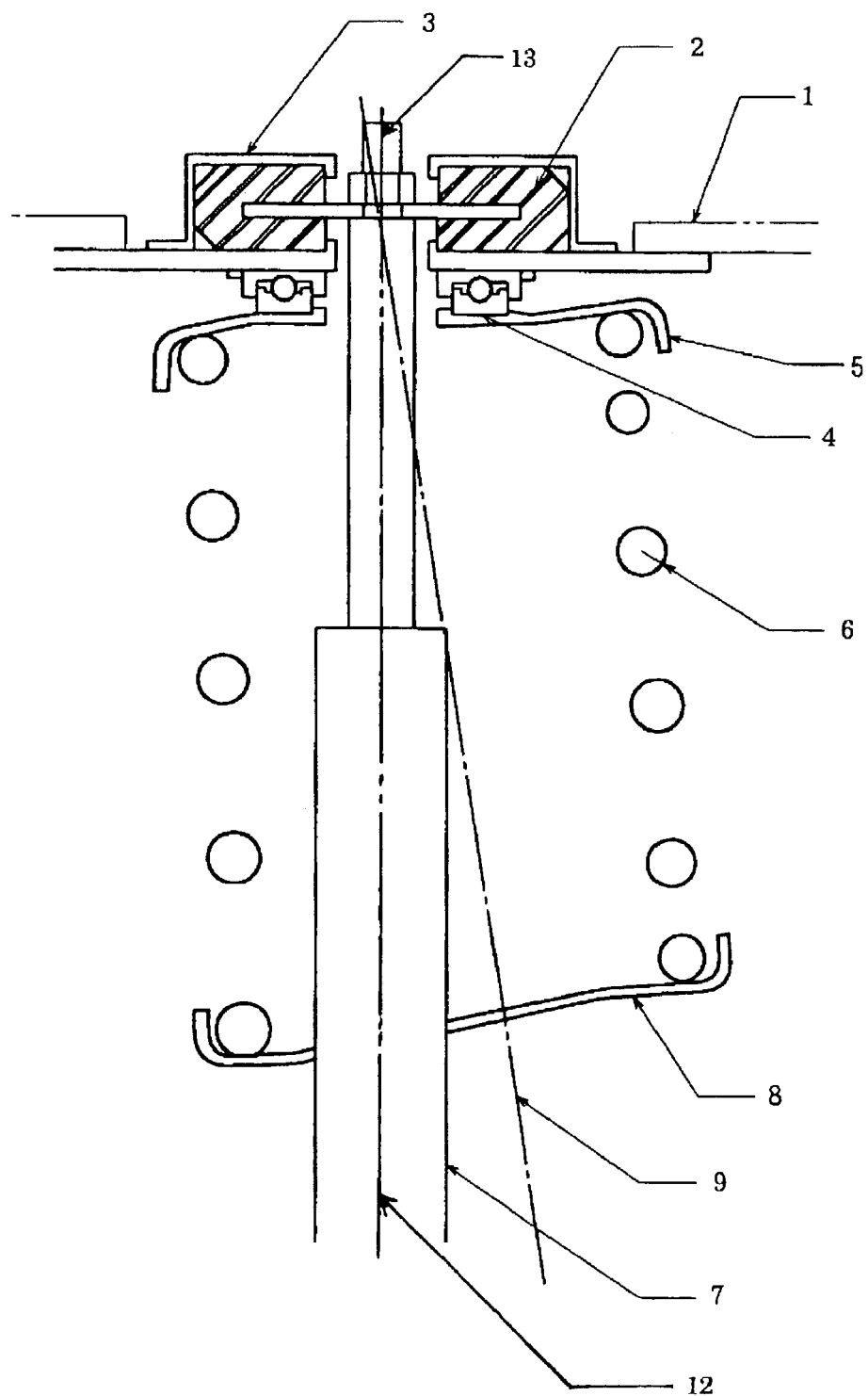
FIG. 4 is a constructional diagram of a prior art example.
Figure 5:
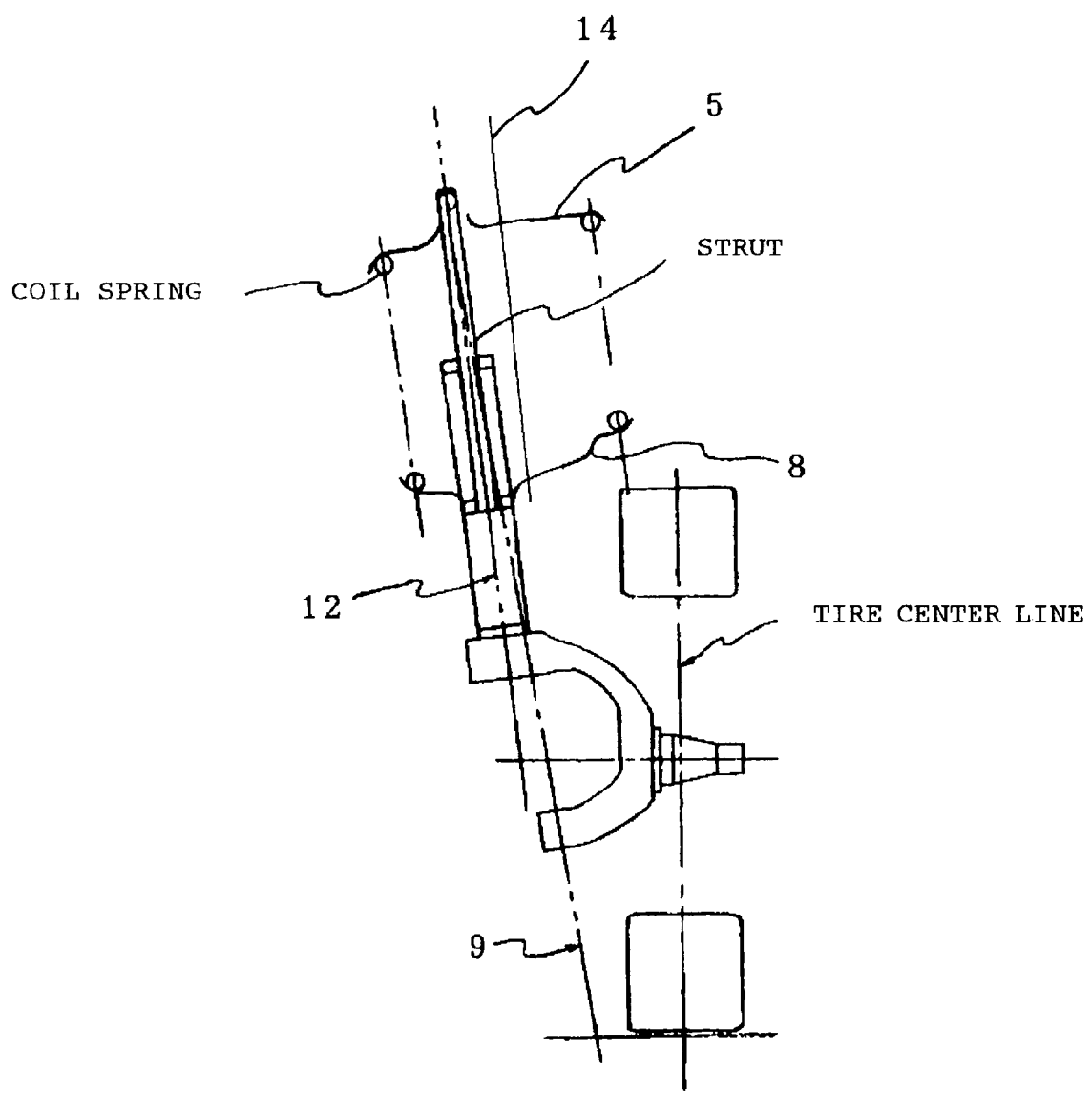
FIG. 5 is a diagram of the operation of the prior art example.
Figure 6:
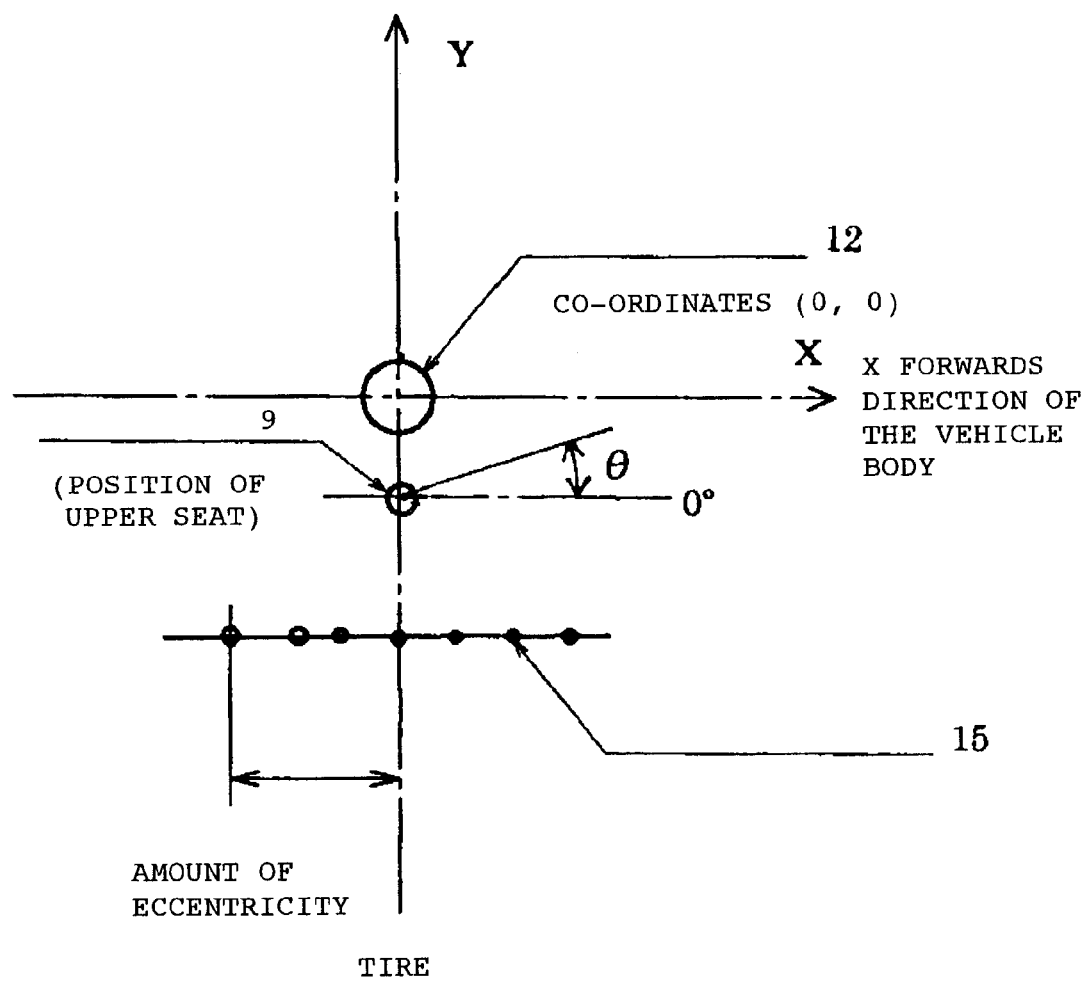
FIG. 6 is a view showing the co-ordinates and the basis for measuring the rotation angle about the kingpin axis at the position of the upper seat in order to illustrate the function.

The relationships of the vehicle body 1, elastic rubber element 2, insulator 3, compression coil spring 6, strut 7, upper seat 5 and lower seat 8 are the same as in the case of the prior art example shown in FIG. 4. However, the bearing 4 that is mounted on the upper seat 5 is mounted at an angle, using angle adjusting members 10 and 11 at the bottom of the insulator 3, so that the centerline of the bearing 4 roughly coincides with the kingpin axis 9.

Both the upper seat and the lower seat rotate about the kingpin axis. Since there is no change in the relative angle and distance between the upper seat and the lower seat when the upper seat and the lower seat are simultaneously rotated, there can be no change in the strain energy of the coil spring.

Figure 2:
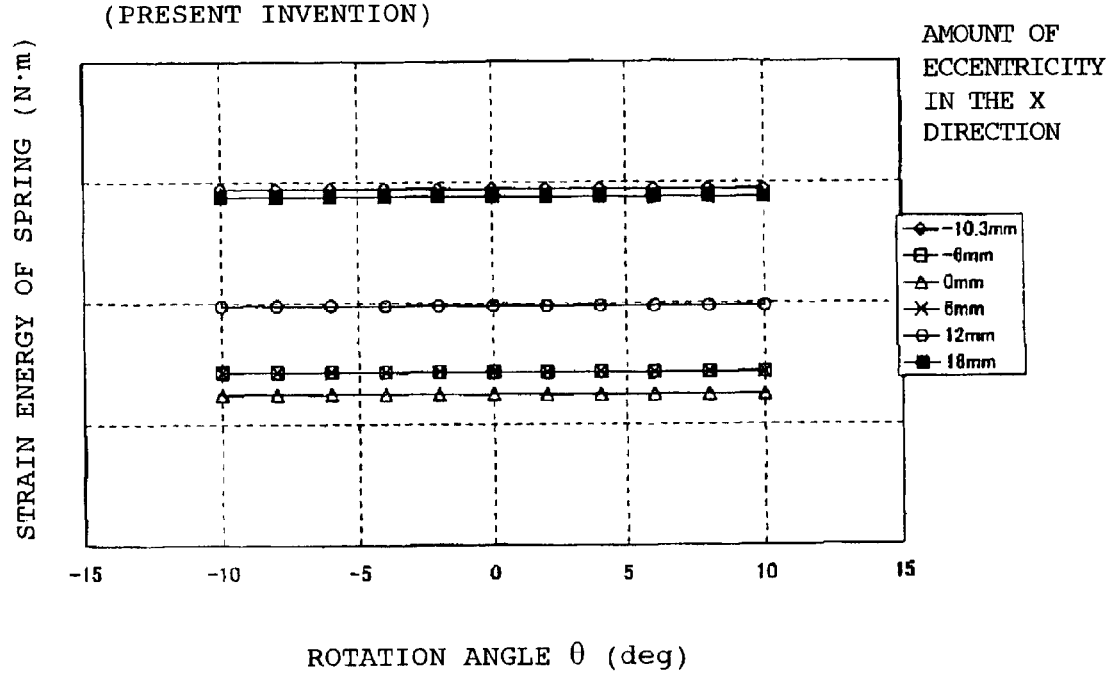
FIG. 2 is a graph showing the relationship between the rotation angle about the kingpin axis and the strain energy of the spring according to the present invention.
Figure 7:
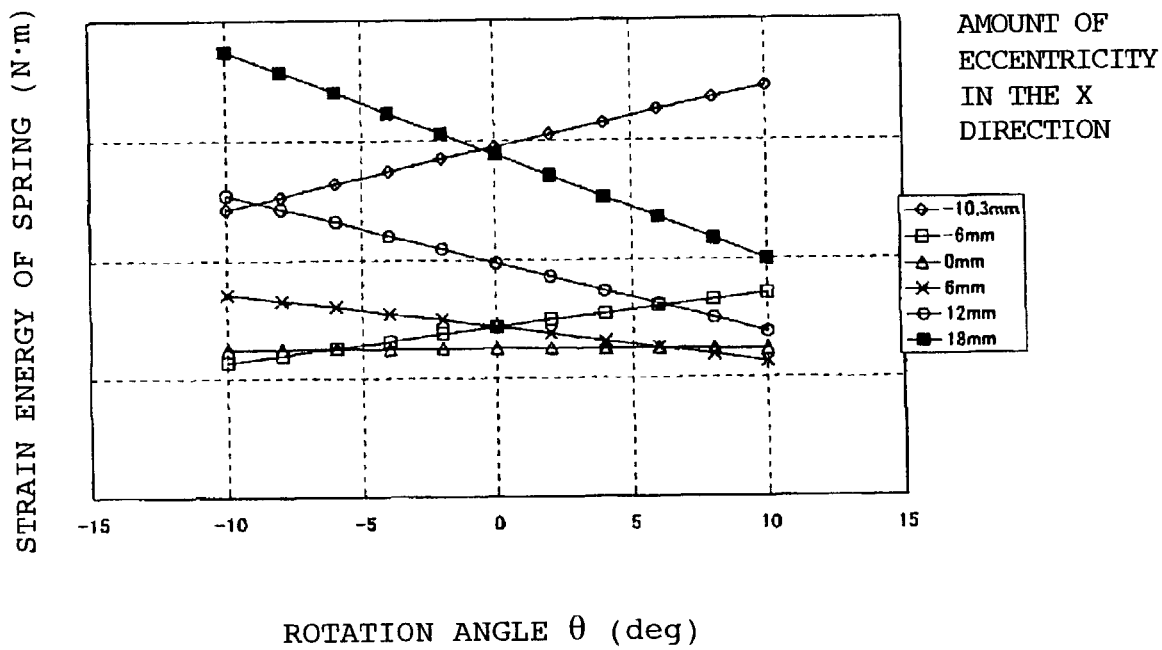
FIG. 7 is a graph showing the relationship between the rotation angle about the kingpin axis and the strain energy of the spring in the prior art example.

By adopting such a construction, a relationship between the rotation angle about the kingpin axis and the strain energy of the spring as shown in FIG. 2 is achieved. As shown in FIG. 2, irrespective of the amount of eccentricity in the X direction, the strain energy of the spring is constant in the same manner as when the amount of eccentricity in the X direction in FIG. 7 is 0 mm. Thus, no rotational moment is generated and high straight traveling stability is achieved.

Figure 3:
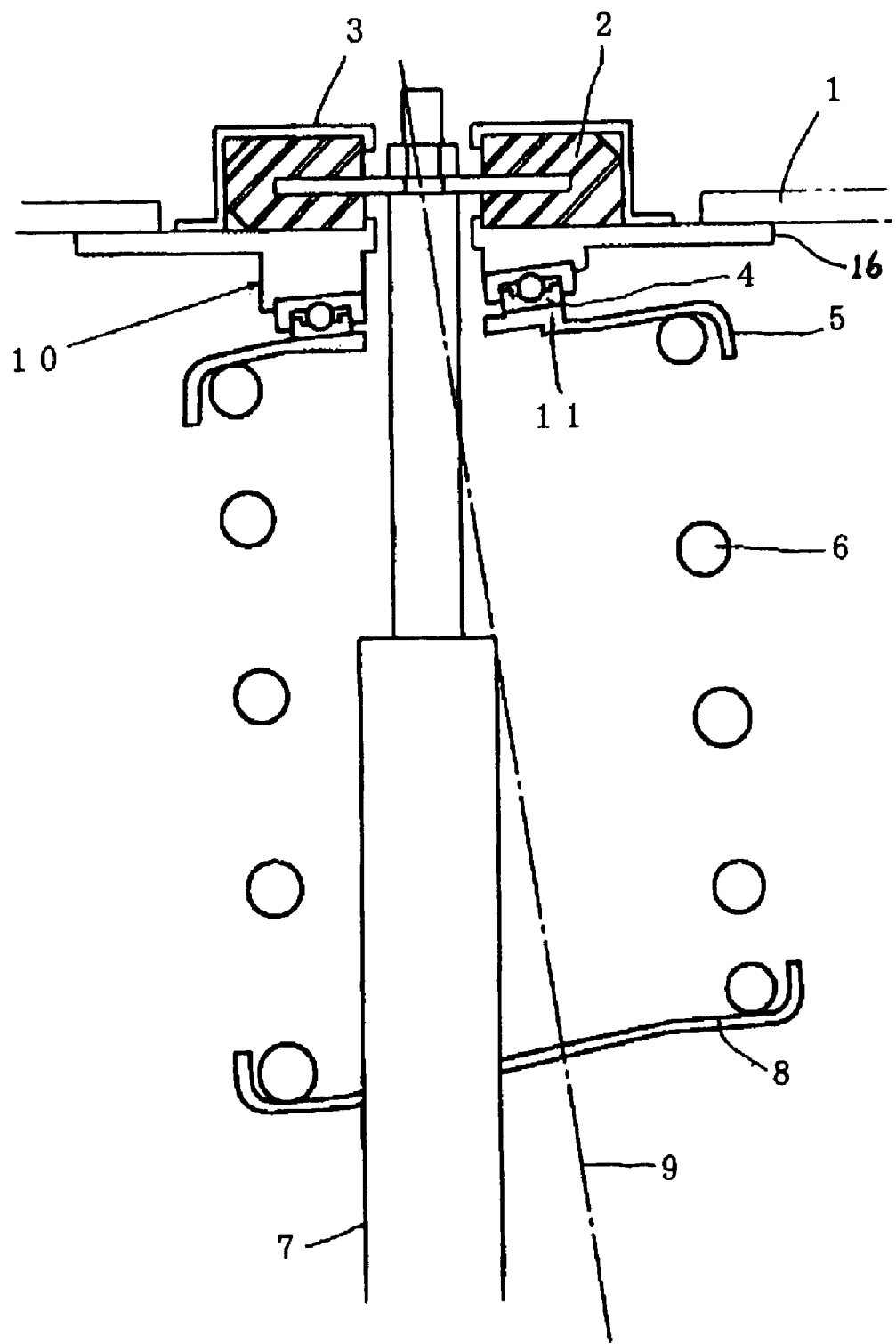
FIG. 3 is a constructional diagram of another embodiment of the present invention.

FIG. 3 is a constructional diagram showing another embodiment of the present invention. Parts that are referred to by the same names as in the case of FIG. 1 and FIG. 4 are shown with the same reference symbols. The shapes of the upper seat 5 and the insulator 3 are formed such that the bearing 4 is perpendicular with respect to the kingpin axis 9. In this embodiment, an angle adjusting member 10 is integrally formed on a support member 16 below the insulator 3, so insertion of an angle adjusting member 10 as shown in FIG. 1 as a separate member is unnecessary. Also, the upper seat 5 is inclined at an angle as shown in the Figure, so insertion of an angle adjusting member 11 as a separate member is not required either.

According to the present invention, without large-scale alteration of the prior art construction, the relationship between the rotational angle about the kingpin axis and the strain energy of the spring can always be maintained constant by using only a single suspension device, and the straight traveling stability can be improved. A construction displaying this effect can easily be implemented in the prior art construction by using the angle adjusting members to adjust the angle of the bearing so that the kingpin axis and the bearing centerline approximately coincide.

What is claimed is:

1. A strut suspension device which comprises a strut (7), an insulator (3) supporting an upper end of the strut (7) and mounted on a vehicle body (1), an upper seat (5) arranged on a lower face of the vehicle body (1), a support member (16) and a bearing (4) interposed between the upper seat (5) and the lower face of the vehicle body (1), a lower seat (8) fixed to said strut (7), a compression coil spring (6) arranged around the strut (7) between the upper seat (5) and the lower seat (8), a first angle adjusting member (10) integrally formed on the support member (16), which contacts with the base of the insulator (3) and is fixed to the lower face of the vehicle body (1), and a second angle adjusting member (11) integrally formed with the upper seat (5), wherein the thickness of said first angle adjusting member (10) is greater on an inner side than on an outer side in a width direction of the vehicle body (1) to mount the bearing (4) on the upper seat (5) in an inclined fashion with an angle and said second angle adjusting member (11) is disposed below the bearing (4) on the outer side in the width direction of the vehicle body (1) to mount the upper seat (5) in such a fashion that a plane containing the upper seat (5) on the outer side is downwardly inclined relative to a plane containing the upper seat (5) on the inner side crossing a kingpin axis (9) roughly at a right angle in the width direction of the vehicle body (1), whereby the bearing is mounted on the upper seat (5) in an inclined fashion and causes the kingpin axis (9) and the bearing central axis to approximately coincide so that no rotational moment is generated about the kingpin axis (9), the device supporting the vehicle body (1) by means of the strut (7) and is capable of turning about the kingpin axis (9).

2. The strut suspension device according to claim 1, wherein the bearing central axis and the strut axis do not coincide.

3. The strut suspension device according to claim 1, wherein the bearing is perpendicular with respect to the kingpin axis.

4. The strut suspension device according to claim 1, wherein a member supporting the upper end of the strut and extending in a traverse direction therefrom has end portions thereof embedded in an elastic rubber element held by the insulator.

* * * * *